(No Model.)

J. SCHWEIGER.
HORSE POWER.

No. 255,202. Patented Mar. 21, 1882.

Attest,
W. H. N. Knight
F. H. Knight

Inventor,
John Schweiger,
by Melville Church
His Atty.

UNITED STATES PATENT OFFICE.

JOHN SCHWEIGER, OF BEAVER DAM, WISCONSIN.

HORSE-POWER.

SPECIFICATION forming part of Letters Patent No. 255,202, dated March 21, 1882.

Application filed October 28, 1881. (No model.)

*To all whom it may concern:*

Be it known that I, JOHN SCHWEIGER, of Beaver Dam, in the county of Dodge and State of Wisconsin, have invented certain new and useful Improvements in Horse-Powers; and I do hereby declare the following to be a full, clear, and exact description of the same, reference being had to the accompanying drawings, forming a part of this specification, in which—

Figure 1:
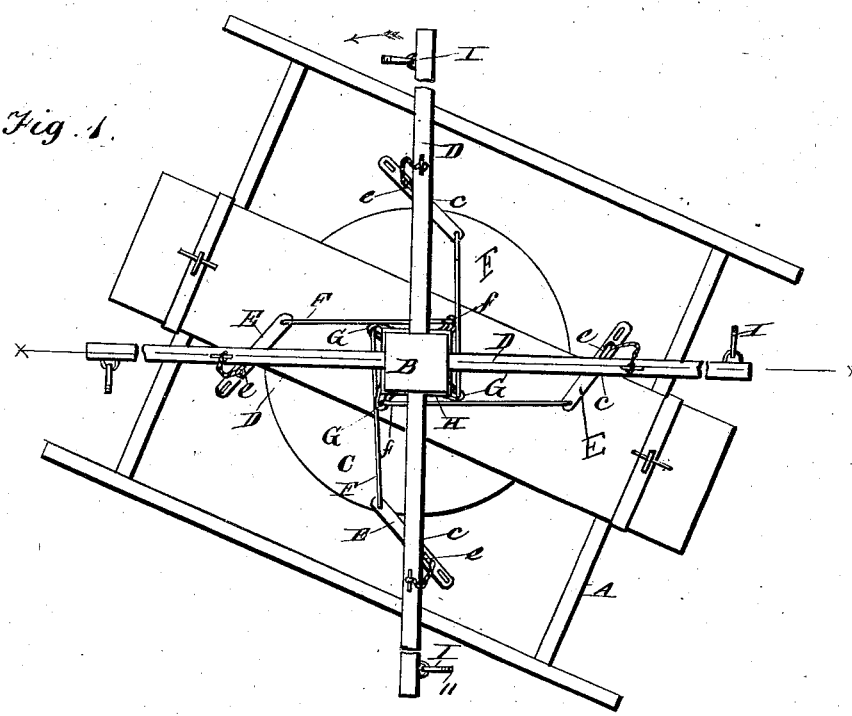
Figure 2:
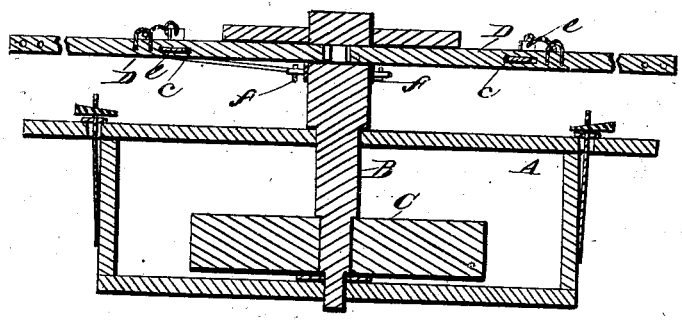

Figure 1 is a top plan view with the platform removed; Fig. 2, a sectional view taken on the line $x\ x$, Fig. 1.

Similar letters of reference in the several figures denote the same parts.

My invention has for its object to provide an improved horse-power for use in driving thrashing-machines and other machines; and it consists in certain novelties of construction, which I will now proceed to describe, and afterward set forth in the claim.

In the accompanying drawings A represents the frame of the power; B, the main shaft or post, carrying within the frame a large driving-pulley, C, over which passes a belt that also passes around a driving-pulley on the thrashing-machine or other piece of machinery to be driven. The upper end of the shaft or post B above the frame is preferably made square, and in suitable transverse sockets in its sides are inserted four removable horse levers or sweeps, D D D D, each alternate two of which are opposite to and in line with each other, as shown. Each of the sweeps is slotted at $c$, and through the slot passes a flat metal bar or plate, E, having secured to one of its ends a metal brace-rod, F, the inner hooked end, $f$, of which is adapted to engage with a metal loop or eye, G, on the shaft or post B. The metal plates E extend out laterally from the sweeps in order that the brace-rods may connect, not with the loops at the nearest corner of the main post, but with the loops at the opposite corners of the post, as shown in Fig. 1, and in order that said rods may be drawn tight when they are engaged with their respective loops the said plates E are made adjustable through the slotted sweeps, and are held in adjusted positions by means of wedges $e\ e$, passed through them and bearing against the sweeps.

The loops G may be secured directly to the post, if desired; but I prefer to attach them to a metal band, H, which encircles the post and is clamped firmly thereto.

In operating my improved horse power two horses are preferably hitched to each sweep by means of draft attachments I, making eight horses in all, and they are then driven in the direction indicated by the arrow, Fig. 1.

In transporting the power from place to place the wedges $e\ e$ can be removed, the metal plates E slid along in their slots, and the hooked ends of the brace-rods unfastened from their respective eyes, whereupon the sweeps can be taken out and folded up together in small compass.

When the power is in operative position I preferably place a platform, K, over the main post and upon the sweeps for the driver to stand or sit upon while attending to the horses.

Having thus described my invention, I claim as new—

In the herein-described horse-power, the combination of the main shaft or post carrying the large pulley C, the removable sweeps or horse-levers, the metal plates passing through lateral slots in the sweeps and the wedges for securing them in adjusted position, the brace-rods connected to the metal plates, and the metal loops or eyes on the main shaft with which the hooked ends of the brace-rods engage, the whole being arranged and adapted for operation substantially in the manner described.

JOHN SCHWEIGER.

Witnesses:
G. STOLZ,
JOHN BEULE.